United States Patent [19]

Jennings, Jr. et al.

[11] Patent Number: 4,742,496
[45] Date of Patent: May 3, 1988

[54] METHOD OF EVALUATING GRAVEL PACKS

[75] Inventors: Alfred R. Jennings, Jr., Plano; Duane C. Uhri, Grand Prairie, both of Tex.

[73] Assignee: Mobil Oil Corporation, New York, N.Y.

[21] Appl. No.: 815,969

[22] Filed: Jan. 3, 1986

[51] Int. Cl.⁴ .......................... G01V 1/00; G01V 1/40
[52] U.S. Cl. ........................... 367/35; 367/86; 181/105; 166/250
[58] Field of Search ................... 367/35, 86; 181/102, 181/105; 166/250, 278; 250/269; 73/155

[56] References Cited

U.S. PATENT DOCUMENTS

| | | | |
|---|---|---|---|
| 3,979,714 | 9/1976 | Zemanek, Jr. | 340/15.5 |
| 4,254,479 | 3/1981 | Wiley | 367/35 |
| 4,459,480 | 7/1984 | Dimon | 250/269 |
| 4,524,435 | 6/1985 | Helbig et al. | 181/102 X |
| 4,587,423 | 5/1986 | Boyce | 250/269 |

OTHER PUBLICATIONS

"Gravel Pack Evaluation", Marvin Neal, Sep. 1983, Society of Petroleum Engineers of AIME, pp. 1611–1616.
"A Quantitative Approach to Gravel Pack Evaluation", M. Neal et al., 6th *SPE Formation*, Feb. 1984.

Primary Examiner—Thomas H. Tarcza
Assistant Examiner—Tod R. Swann
Attorney, Agent, or Firm—Alexander J. McKillop; Michael G. Gilman; Charles A. Malone

[57] ABSTRACT

A modified acoustic logging tool to evaluate the condition of a gravel pack is disclosed. Said tool is placed in the wellbore near the gravel pack. An initial log is obtained via said tool at the conclusion of the initial gravel pack treatment. Information gained from the log is indicative of gravel fill and quality. Subsequent logging measurements are indicative of changes in said pack and indicative of remedial treatments.

7 Claims, 1 Drawing Sheet

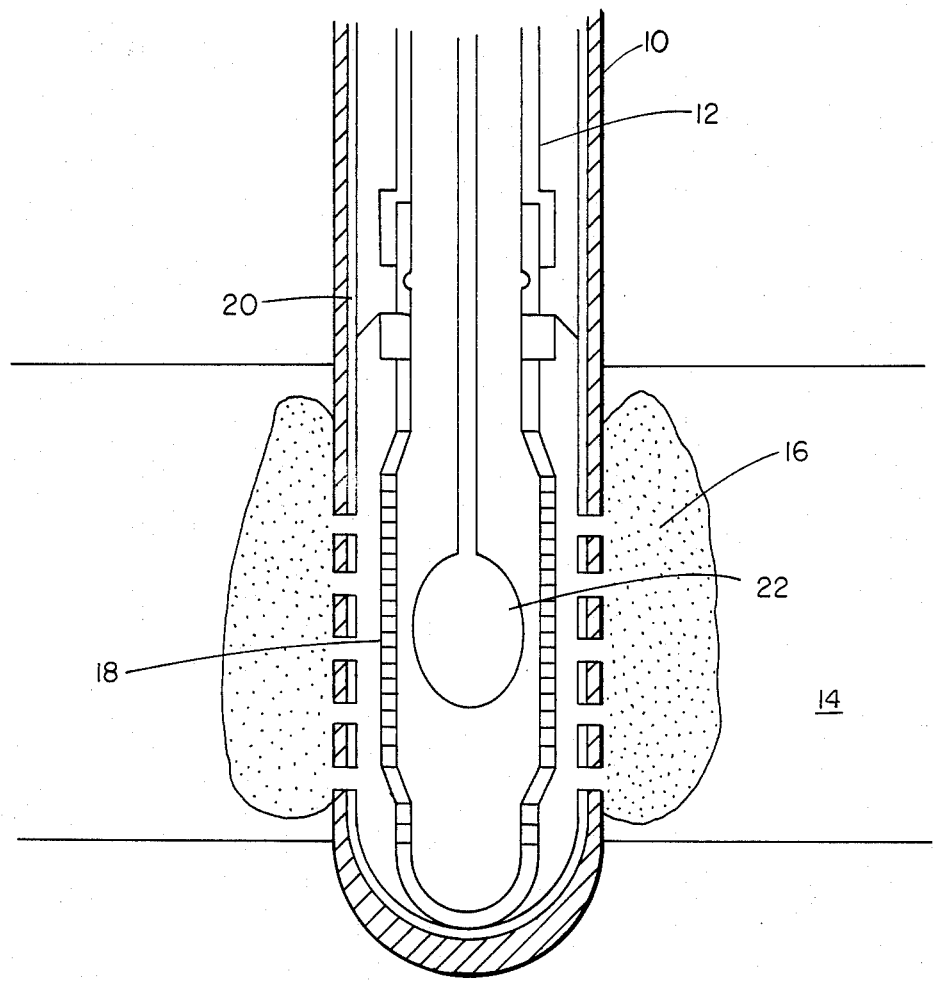

METHOD OF EVALUATING GRAVEL PACKS

FIELD OF THE INVENTION

This invention is directed to the field of hydrocarbonaceous completion methods. More particularly, it is directed to a method for pre-production determination of gravel pack efficiency. Also the method is useful in monitoring gravel pack efficiency during production of hydrocarbonaceous fluids.

BACKGROUND OF THE INVENTION

Gravel pack treatments are frequently conducted in loosely consolidated formations to retain formation particles so hydrocarbonaceous fluids can be produced through the pack. Most gravel packs are placed within a well in conjunction with a slotted liner or wire-wrapped screen. The liner or screen is used to help hold the sand control gravel in place and has small slots of sufficient size to allow production of hydrocarbonaceous fluids through the liner. There are several areas in the world such as the Gulf Coast, offshore California, Canada, and Africa where gravel pack treatments are conducted as a standard operating procedure in well completions.

Although the use of gravel packs is widespread for control of formation sand production, existing methods of evaluating the efficiency of the gravel pack usually depend on observation of hydrocarbon production through the pack. Workover of the pack then requires substantial down time and frequently involves complete removal of the liner and initial gravel pack. These reworks are costly and can result in formation damage due to the loss of kill fluids and additional gravel pack fluid to the formation.

Most successful gravel packs eventually require remedial treatments such as acidizing or solvent washes to remove deposited material from the pack bed to restore permeability to the pack for the production of formation hydrocarbons. It is difficult to ascertain, by existing methods, the reason for the decreased productivity through the pack. However, if an improper remedial treatment is selected, additional damage can occur leading to a further decrease in productivity. Reasons for decreased productivity through an otherwise successful gravel pack include reservoir depletion, accumulation of formation fines and silt, scale buildup from formation water flowing through the pack, and asphaltene and/or paraffin precipitation. Pressure buildup tests are occasionally used in gravel pack evaluation. These tests, conducted carefully using correct procedures, provide an excellent indication of degree of reservoir depletion and will also give information related to the extent of pack damage. However, reservoir pressure tests cannot be used to determine the type of damage in the pack if a "positive skin" is calculated from the measured data.

Therefore, what is needed is a method to determine the efficiency of a gravel pack prior to producing hydrocarbonaceous fluids through said pack. Also, what is needed is a method to ascertain the cause of decreased efficiency in a gravel pack during the production of hydrocarbonaceous fluids so the correct remedial treatment can be instituted.

SUMMARY OF THE INVENTION

This invention is directed to a method for evaluating gravel pack efficiency within a wellbore. In the practice of this invention an acoustic logging tool is run into the wellbore through the area containing the gravel pack prior to producing hydrocarbonaceous containing fluids through said pack. Said logging tool is thereafter directed down said well and through the gravel pack. An initial log of data is acquired regarding the density of the pack. If the density is less than required, the gravel pack is removed and reworked.

If the initial log of data reveals the existence of the desired density within the pack, hydrocarbonaceous containing fluids are produced through the pack. During the production of said hydrocarbonaceous fluids through the pack, additional data logs are obtained regarding density changes within the pack. Density changes occur within the pack due to the nature of fines and particulate matter removed from the said hydrocarbonaceous containing fluids. When the density of the pack has changed to an undesirable level or the production of hydrocarbonaceous fluids has become too low, a remedial treatment is prescribed for the pack based upon the density changes which occurred while producing the well as revealed by the data logs.

Production of said hydrocarbonaceous fluids is ceased and the prescribed remedial treatment instituted. Upon completion of the prescribed remedial treatment, an initial log is obtained to determine the density of the pack. If the density of the pack reveals that the remedial treatment has been effective, the production of hydrocarbonaceous fluids is commenced. The method is then repeated to obtain additional logs regarding the pack density during the production intervals.

It is therefore an object of this invention to provide for an improved method to determine the efficiency of a gravel pack.

It is a further object of this invention to minimize well down time and increase the production of hydrocarbonaceous fluids.

A yet further object of this invention is to extend the life of production equipment by more effectively removing fines and particulate matter from hydrocarbonaceous fluids.

It is a still yet further object of this invention to ascertain qualitatively and quantitatively the nature of matter causing the gravel pack to lose its efficiency so a proper remedial treatment can be undertaken.

BRIEF DESCRIPTION OF THE DRAWING

The drawing is a schematic view of a gravel pack within a well in a hydrocarbonaceous fluid producing formation.

DESCRIPTION OF PREFERRED EMBODIMENTS

In the practice of this invention, as shown in the drawing, a well 10 penetrates formation 14. A production string 12 is directed into well 10. On the end of the production string near the production interval in formation 14, is connected a slotted liner 18. Completion gravel is placed into washed out area 16 to form a gravel pack within formation 14, and also into the area between the well casing 20 and slotted liner 18.

Once gravel pack 16 is in place, a modified accoustical logging tool 22 is suspended into well 10 into the slotted liner or wire-wrapped screen area 18 which contains gravel pack 16. An accoustical logging tool 22 which can be used in the practice of this invention is described by Zemanek in U.S. Pat. No. 3,979,714 which issued Sept. 17, 1976. This patent is hereby incorporated by reference. The accoustical logging tool is operated in a manner as disclosed by Zemanek, supra, and a log is made of the density in the area of the gravel pack 16. The measurements made are similiar in nature to a cement bond log. Information gained from the initial log is an indication of gravel fill and the quality of the pack. When the initial log of data indicates that the density is from about 2.00 to about 3.00 gms/cc, the density is considered to be sufficient to make an effective gravel pack for removing undesired materials from hydrocarbonaceous fluids and for preventing formation damage. If information gained from the initial log indicates that the gravel fill is too loose or insufficient gravel is contained in said pack, the gravel pack is worked over to increase its efficiency. During the reworking additional gravel can be placed into the pack and the desired density can be obtained. Thus, additional formation damage can be minimized and further down time avoided. Unconsolidated fines and particulate matter will thus be held in place preventing the enlargement of any washed out areas near the wellbore.

Once the pack has been reworked and packed to the desired density, it is then placed into the productive interval within formation 14. Another log of data is taken and the well is placed back into production. As hydrocarbonaceous fluids, including water, flow from formation 14, through gravel pack 16, fines, particulate matter, sludge and scale are entrapped within gravel pack 16. The kind of material entrapped or deposited within gravel pack 16 causes a change in the pack density. A change of density from the initial log of data obtained to a lower density would indicate the presence of a hydrocarbonaceous sludge. Increase of the initial density to a higher density is indicative of scale formation. In order to obtain data regarding a change in density of the pack, logs are made of the pack via the accoustical logging tool.

Logs of data are otained at specified intervals when the well is being produced. Of course the frequency of obtaining a log will vary from about once per year or more frequently depending on the volume of hydrocarbonaceous fluids produced from a particular well. As will be understood by those skilled in the art, the nature of the material and the volume of material contained in the hydrocarbonaceous fluid may dictate the frequency of obtaining additional logs of data.

After materials entrapped or deposited within the pack have been identified by a change in density, a remedial treatment can be prescribed for the pack should a treatment become necessary. A change to a lower density, indicative of sludge presence, would dictate the use of a hydrocarbonaceous solvent treatment. Hydrocarbonaceous solvents useful in removing the sludge include, kerosene, naptha, and other distillates that are known to those skilled in the art.

A change from the initial log density to a higher density, indicative of scale within the formation, dictates that an acid is useful in removing scale from the pack. Hydrochloric acid is useful in removing scale from the pack. Other acids useful in treating the well and pack are known to those skilled in the art.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

I claim:

1. A method for evaluating gravel pack efficiency within a wellbore comprising:
    (a) running an accoustic logging tool into said wellbore through said gravel pack area prior to producing hydrocarbonaceous fluids through said gravel pack;
    (b) obtaining via said logging tool an initial log of data regarding the density of said gravel pack;
    (c) determining that the density of said gravel pack is sufficient to make an effective gravel pack from said log of data;
    (d) producing hydrocarbonaceous fluids and water through said gravel pack which causes the density of said pack to change due to removal of materials from said hydrocarbonaceous fluids and water, which density varies in relationship to the materials removed;
    (e) obtaining subsequent logs of data during the production interval which data reflects a change in density and efficiency of said gravel pack, and also results in a reduction in the production of hydrocarbonaceous fluids; and
    (f) ceasing the production of hydrocarbonaceous fluids when said production has become substantially reduced and providing for remedial treatment of said gravel pack in relationship to the materials removed as determined by the density from subsequent logs.

2. The method as recited in claim 1 where in step (c) said density is from about 2.00 to about 3.00 g/cc.

3. The method as recited in claim 1 where in step (e) subsequent logs of data indicate that the density of said gravel pack is lower than the density of said gravel pack obtained with the initial log of data.

4. The method as recited in claim 1 where in step (e) subsequent logs of data indicate that the density of said gravel pack is higher than the density of said gravel pack obtained with the initial log of data.

5. The method as recited in claim 1 where in step (e) said subsequent logs of data are obtained at least yearly.

6. The method as recited in claim 1 where in step (f) subsequent logs of data indicate that the density of said gravel pack is lower than the density of said gravel pack obtained with the initial log of data and which density change indicates that a hydrocarbon solvent is useful in removing materials that caused the density to become lowered.

7. The method as recited in claim 1 where in step (f) subsequent logs of data indicate that the density of said gravel pack is lower than the density of said gravel pack obtained with the initial log of data and which density change indicates that an acidizing treatment is useful in removing materials that caused the density to become higher.

* * * * *